(12) United States Patent
Kuzuyama (10) Patent No.: US 7,720,590 B2
(45) Date of Patent: May 18, 2010

(54) HOMOGENOUS CHARGE COMPRESSION IGNITION ENGINE AND CONTROLLING METHOD OF THE ENGINE

(75) Inventor: Hiroshi Kuzuyama, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 72 days.

(21) Appl. No.: 12/288,001

(22) Filed: Oct. 14, 2008

(65) Prior Publication Data

US 2009/0099751 A1    Apr. 16, 2009

(30) Foreign Application Priority Data

Oct. 15, 2007    (JP)    ............... 2007-267528

(51) Int. Cl.
*F02D 45/00*    (2006.01)
*F02D 13/02*    (2006.01)
*F02B 11/00*    (2006.01)

(52) U.S. Cl. ............ 701/102; 123/90.15; 123/295

(58) Field of Classification Search ........... 701/102, 701/101, 115; 123/90.15, 295, 299, 305, 123/435, 568.14, 568.11
See application file for complete search history.

(56) References Cited

U.S. PATENT DOCUMENTS 6,739,295 B1 *    5/2004    Yamaoka et al. ......... 123/90.15

6,772,585 B2      8/2004    Iihoshi et al. ............ 60/277
7,089,913 B2 *    8/2006    Yamaoka et al. ........ 123/568.14
7,290,521 B2 *   11/2007    Ogawa et al. ............ 123/299

FOREIGN PATENT DOCUMENTS

| JP | 2003-106184 |   | 4/2003 |
|---|---|---|---|
| JP | 2003-184606 |   | 7/2003 |
| JP | 2003-193872 |   | 7/2003 |
| JP | 2004-150383 |   | 5/2004 |
| JP | 2009-97365 A | * | 5/2009 |

* cited by examiner

*Primary Examiner*—Hieu T Vo
(74) *Attorney, Agent, or Firm*—Locke Lord Bissell & Liddell LLP

(57) ABSTRACT

An ECU switches a combustion mode of an HCCI engine from HCCI combustion to spark ignition combustion. The ECU executes the following operations a) and b) before switching an intake lift amount from a first intake lift amount to a second intake lift amount:

a): switching an exhaust lift amount from a first exhaust lift amount to a second exhaust lift amount while ensuring an internal EGR amount, and b): delaying a closing timing of an exhaust valve so as to reduce the internal EGR amount after switching the exhaust lift amount from the first exhaust lift amount to the second exhaust lift amount.

5 Claims, 5 Drawing Sheets

HOMOGENOUS CHARGE COMPRESSION IGNITION ENGINE AND CONTROLLING METHOD OF THE ENGINE

BACKGROUND OF THE INVENTION

The present invention relates to a homogenous charge compression ignition engine (HCCI engine). In the HCCI engine of the present invention, the combustion mode can be switched between homogenous charge compression ignition combustion (HCCI combustion) and spark ignition combustion (SI combustion).

In recent years, homogenous charge compression ignition (HCCI) engines have been drawing attention, and various researches have been conducted on such engines. Excellent fuel economy and thermal efficiency and low emission can be gained from the HCCI engines. In some kinds of HCCI engines, fuel is directly injected into a combustion chamber during an intake stroke. That is, only air is drawn into the combustion chamber from an intake passage and fuel is mixed with air for the first time in the combustion chamber. However, in most of the HCCI engines, the fuel is mixed with air on the intake passage so as to generate air-fuel mixture. The air-fuel mixture is supplied to the combustion chamber from the intake passage.

The temperature increases and the pressure rises in the air-fuel mixture contained inside the combustion chamber as a piston rises at the time of the compression stroke of the engine, so that the mixture spontaneously ignites. One obstacle that needs to be overcome in terms of putting HCCI engines into practice is that the engine operating range, which allows homogenous charge compression ignition (HCCI) combustion to be stably controlled, is still narrow. In order to overcome the obstacle, there is a trend to implement HCCI combustion in stationary engines where the ordinarily used operating range is relatively narrow, for example, gas engines for GHPs (gas heat pumps).

In an actual operation of the HCCI engines, an engine low rotation speed range, a middle rotation speed range, a low load range and a middle load range are frequently used. It has been proposed that the combustion mode is switched between the HCCI combustion range and the spark ignition (SI) combustion range according to the running state of the engine. The spark ignition (SI) combustion is carried out in the high rotation speed range, the extremely low load range, and the high load range.

For example, Japanese Laid-Open Patent Publication No. 2003-106184 (JP 2003-106184 A) discloses a configuration in which a throttle is closed so as to return the air-fuel ratio to be stoichiometric when the combustion mode is switched from the HCCI combustion to the spark ignition combustion. Then, the lift amount of an exhaust valve is increased so as to reduce the internal EGR amount. That is, when the combustion mode is switched from the HCCI combustion to the spark ignition combustion, the throttle is first closed. This may cause insufficient intake air or low torque and makes the combustion difficult. Therefore, this may cause fluctuation of engine torque or occurrence of abrupt changes in the torque.

Japanese Laid-Open Patent Publication No. 2004-150383 (JP 2004-150383 A) discloses a configuration in which the combustion mode is first switched from the HCCI combustion to the stratified spark ignition combustion and then to the spark ignition combustion. Therefore, an in-cylinder injector is essential in the combustion chamber. When the combustion mode is switched from the HCCI combustion to the spark ignition combustion, the fuel injection amount is gradually increased in a state of the stratified spark ignition combustion. When the air-fuel ratio of the air-fuel mixture is reduced to a predetermined value, the fuel injection timing is advanced and the throttle opening degree is reduced. Accordingly, the combustion mode is switched to the normal spark ignition combustion in a stoichiometric state. That is, after the throttle opening degree is increased, the combustion mode is switched from the stratified spark ignition combustion to the normal spark ignition combustion in a stoichiometric state. If the throttle opening degree is reduced in this way, abrupt changes may occur in the torque.

An objective of the present invention is to suppress the occurrence of abrupt changes in the torque of the HCCI engine when the combustion mode is switched from the HCCI combustion to the spark ignition combustion.

One aspect of the present invention provides a homogeneous charge compression ignition (HCCI) engine that allows a combustion mode to be switched between an HCCI combustion and a spark ignition combustion. The HCCI engine comprises a combustion chamber, an intake valve and an exhaust valve. An intake variable valve mechanism changes an intake lift amount, which is a lift amount of the intake valve. The intake lift amount is set to a first intake lift amount in the HCCI combustion and the intake lift amount is set to a second intake lift amount in the spark ignition combustion. An exhaust variable valve mechanism changes an exhaust lift amount, which is a lift amount of the exhaust valve. The exhaust lift amount is set to a first exhaust lift amount in the HCCI combustion and the exhaust lift amount is set to a second exhaust lift amount in the spark ignition combustion. A controller controls the intake variable valve mechanism and the exhaust variable valve mechanism. The controller sets an internal EGR amount, which includes the amount of burned gas that remains in the combustion chamber at the time of the HCCI combustion and burned gas re-drawn into the combustion chamber through an exhaust port. The controller sets a negative valve overlap period during which both of the intake valve and the exhaust valve are closed such that not all the burned gas is discharged from the combustion chamber. When switching the combustion mode from the HCCI combustion to the spark ignition combustion, the controller executes following operations of a) and b) before switching the intake lift amount from the first intake lift amount to the second intake lift amount:

a): switching the exhaust lift amount from the first exhaust lift amount to the second exhaust lift amount while ensuring the internal EGR amount and b): delaying a closing timing of the exhaust valve so as to reduce the internal EGR amount after switching the exhaust lift amount from the first exhaust lift amount to the second exhaust lift amount.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DESCRIPTION OF THE PREFERRED EMBODIMENT

Figure 1:
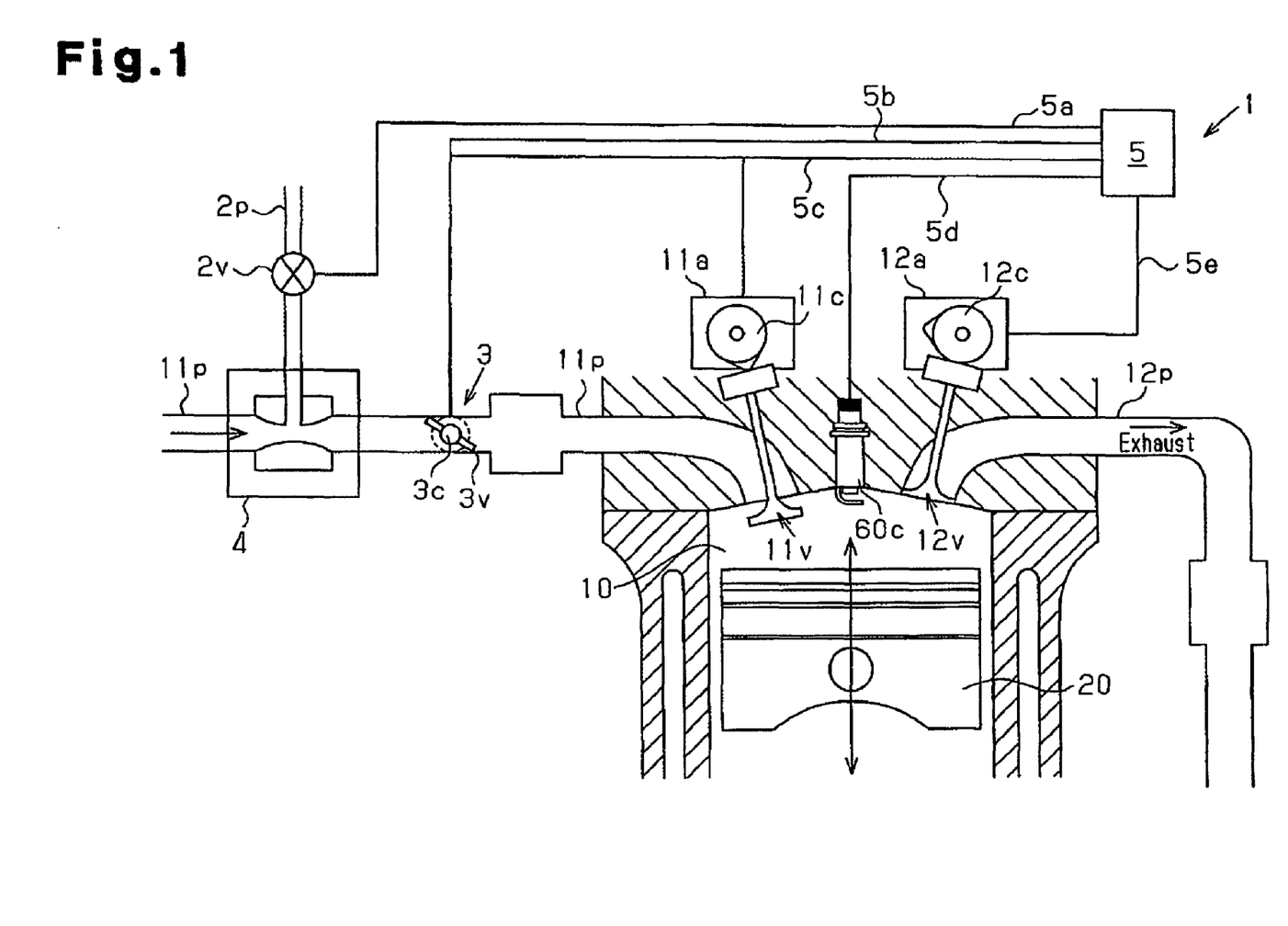
FIG. 1 is a block diagram of an HCCI engine according to one embodiment of the present invention.

FIGS. 1 to 5B show one embodiment of the present invention. FIG. 1 shows an HCCI engine 1 according to one embodiment.

As shown in FIG. 1, the HCCI engine 1 has a combustion chamber 10, an intake passage 11p, an intake valve 11v, an exhaust valve 12v, an exhaust passage 12p, and a piston 20. The intake passage 11p is connected to the combustion chamber 10. The operating state of the HCCI engine 1 is switched between HCCI combustion and spark ignition combustion according to the operating condition such as an engine load and the number of rotation of the engine. An ECU (electronic control unit) 5 is a controller that switches the operating state of the HCCI engine 1. As a result, the combustion mode is switched between the HCCI combustion, which reduces fuel consumption, and the spark ignition combustion, which increases output power, as is necessary.

A mixing portion 4 is provided on the intake passage 11p. Fuel is supplied from a fuel tank (not shown) to the mixing portion 4 through a fuel supplying path 2p so that air and the fuel are mixed in the mixing portion 4. Gasoline or a gas fuel such as city gas or LPG may be used as the fuel. The mixing portion 4 is a carburetor. If the gas is used as the fuel, the mixing portion 4 may be a mixer.

A throttle 3 is provided on the intake passage 11p between the mixing portion 4 and the combustion chamber 10. A fuel valve 2v is provided on the fuel supplying path 2p. The fuel valve 2v functions as a fuel supplying device. The ECU 5 controls operations of the fuel valve 2v, the throttle 3, the intake valve 11v, an ignition plug 60c, and the exhaust valve 12v. The ignition plug 60c is an igniting portion that is used at the time of the spark ignition combustion. The ignition plug 60c may be used when the combustion mode is switched from the HCCI combustion to the spark ignition combustion to stabilize the combustion. The ECU 5 controls the fuel valve 2v, the throttle 3, the intake valve 11v, the ignition plug 60c and the exhaust valve 12v through control cables 5a to 5e, respectively.

The ECU 5 controls an opening degree of the fuel valve 2v so as to control the fuel supplying amount to the intake passage 11p.

The throttle 3 has a shaft 3c, a vane 3v, and a step motor (not shown). The vane 3v is rotated around the shaft 3c. The ECU 5 controls the step motor to control the opening degree of the vane 3v, that is, the throttle opening degree TA. As a result, the intake supply amount to the combustion chamber 10 is controlled.

An intake variable valve mechanism 11a controls a lift amount and an open/close timing of the intake valve 11v via the intake cam 11c. In this embodiment, the lift amount of the intake valve 11v represents an intake valve characteristics. A maximum intake lift amount IL represents the maximum lift amount of the intake valve 11v. An exhaust variable valve mechanism 12a controls a lift amount and an open/close timing of the exhaust valve 12v. In this embodiment, the lift amount of the exhaust valve 12v represents an exhaust valve characteristics. A maximum exhaust lift amount EL represents a maximum lift amount of the exhaust valve 12v.

The ECU 5 controls the intake variable valve mechanism 11a and the exhaust variable valve mechanism 12a. The intake variable valve mechanism 11a and the exhaust variable valve mechanism 12a are variable valve mechanisms that change valve characteristics such as the lift amount and the valve open/close timing of the intake valve 11v and the exhaust valve 12v according to the operating conditions of the HCCI engine 1.

As disclosed in Japanese Laid-Open Patent Publication Nos. 5-106411 and 10-18826 (JP 5-106411 A and JP 10-18826 A), the intake cam 11c is switched between a low lift cam and a high lift cam. The ECU 5 uses the low lift cam when setting the first intake lift amount IL1 and uses the high lift cam when setting the second intake lift amount IL2. The maximum intake lift amount IL is set to the first intake lift amount IL1 in the HCCI combustion, and is set to the second intake lift amount IL2 in the spark ignition combustion. The first intake lift amount IL1 is smaller than the second intake lift amount IL2. The ECU 5 switches the intake cam 11c between the low lift cam and the high lift cam according to the operating conditions of the HCCI engine 1. As a result, the maximum intake lift amount IL is changed.

Similarly, the exhaust cam 12c is switched between a low lift cam and a high lift cam. The ECU 5 uses the low lift cam when setting the first exhaust lift amount EL1 and uses the high lift cam when setting the second exhaust lift amount EL2. The maximum exhaust lift amount is set to the first exhaust lift amount EL1 in the HCCI combustion, and is set to the second exhaust lift amount EL2 in the spark ignition combustion. The first exhaust lift amount EL1 is smaller than the second exhaust lift amount EL2.

The intake cam 11c is provided on an intake camshaft (not shown). Power generated in the combustion chamber 10 is transmitted to the intake camshaft via a crankshaft of the HCCI engine 1 so as to rotate the intake cam 11c. An intake cam gear is provided on an end portion of the intake camshaft (not shown). The intake cam gear transmits a driving force of the crankshaft to the intake camshaft. The ECU 5 controls a phase difference between the intake cam gear and the intake camshaft according to the known method. Similarly, the exhaust cam 12c is provided on the exhaust camshaft (not shown). Power generated in the combustion chamber 10 is also transmitted to the exhaust camshaft so as to rotate the exhaust cam 12c. An exhaust cam gear is provided on an end portion of the exhaust camshaft (not shown). The exhaust cam gear transmits a driving force of the crankshaft to the exhaust camshaft. The ECU 5 controls a phase difference between the exhaust cam gear and the exhaust camshaft according to the known method.

The ECU 5 controls the intake variable valve mechanism 11*a* and the exhaust variable valve mechanism 12*a* so as to provide a negative valve overlap period at the time of HCCI combustion. As a result, internal EGR gas is generated and the HCCI combustion is carried out. The negative valve overlap period is a period during which both of the exhaust valve 12*v* and the intake valve 11*v* are closed when the piston is located in the vicinity of the exhaust top dead center TDC. The exhaust top dead center TDC is a top dead center when an exhaust stroke of an engine ends. The ECU 5 closes the exhaust valve 12*v* at the timing advanced from the exhaust top dead center TDC. Since a part of burned gas remains in the combustion chamber 10, the internal EGR gas is generated. The internal EGR amount Qegr represents the sum of the burned gas that remains in the combustion chamber 10 without being discharged therefrom and the burned gas that has been temporarily discharged from the combustion chamber 10 and then returned to the combustion chamber 10 from the exhaust passage 12*p* through the exhaust valve 12*v* when the exhaust valve 12*v* is subsequently opened. The internal EGR gas remains in the combustion chamber 10 until the next combustion cycle. The internal EGR gas having a high temperature is mixed with air-fuel mixture that is newly supplied to the combustion chamber 10. This increases the temperature in the combustion chamber 10. Therefore, the ignitability of the air-fuel mixture at the time of HCCI combustion is improved. The ECU 5 controls a length of the negative valve overlap period so as to control the ignition timing of the HCCI-combustion to some extent.

Figure 2:
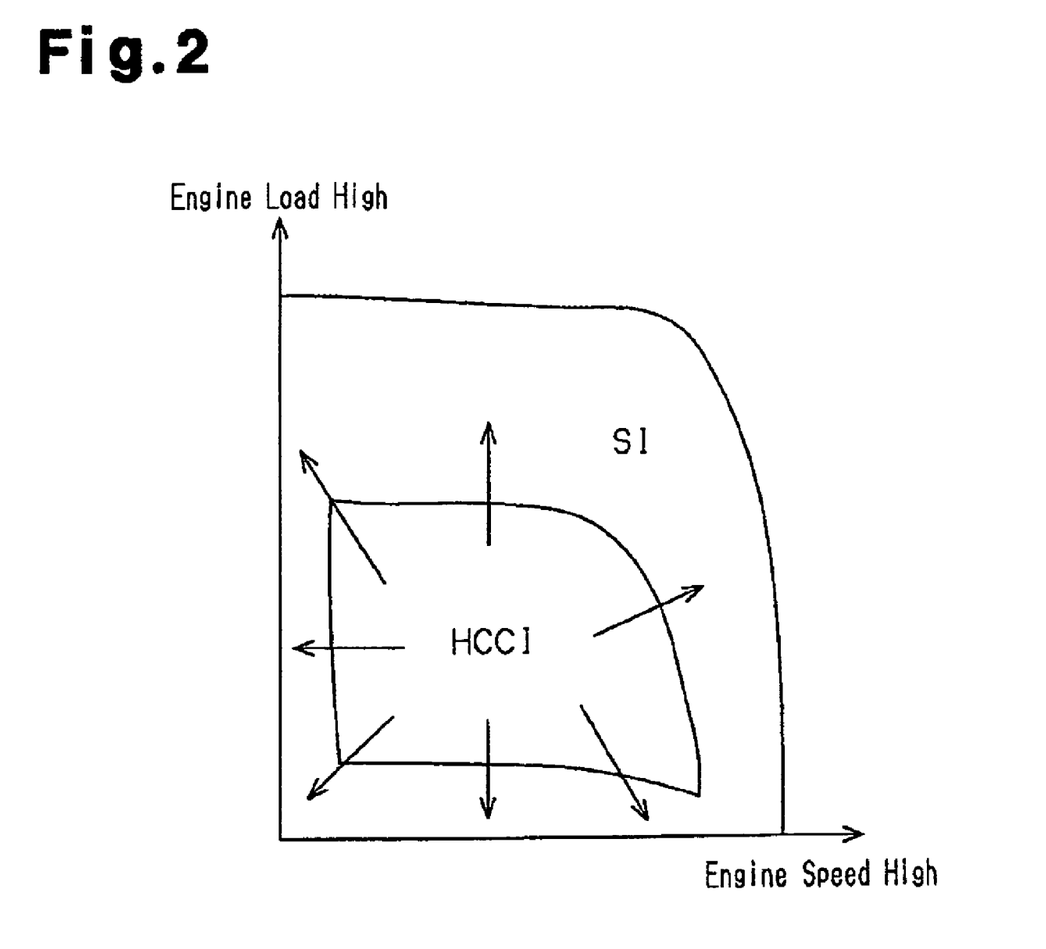
FIG. 2 is a graph showing a relationship between an engine load and an engine speed and showing an operating range of the HCCI engine of FIG. 1 in the HCCI combustion and the spark ignition combustion.
Figure 4A:
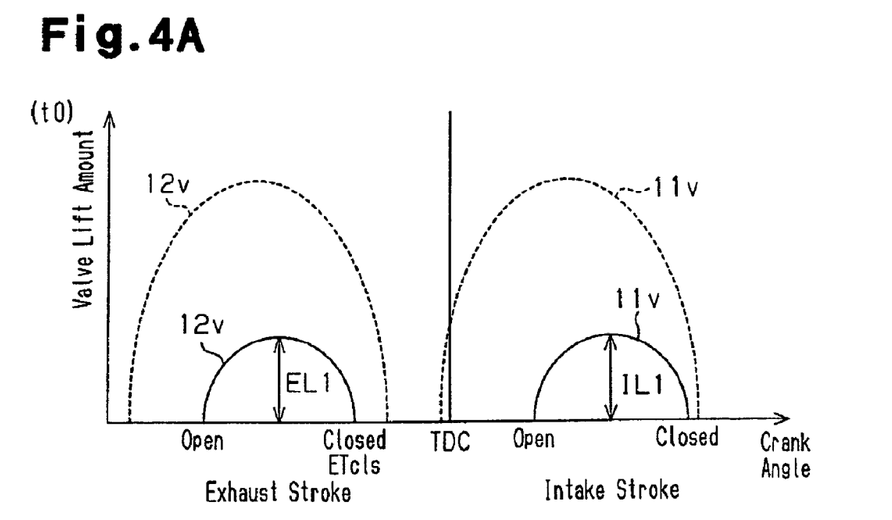
FIG. 4A is a timing chart showing the intake lift amount and the exhaust lift amount in the HCCI combustion at time point t0 in FIG. 3.
Figure 4B:
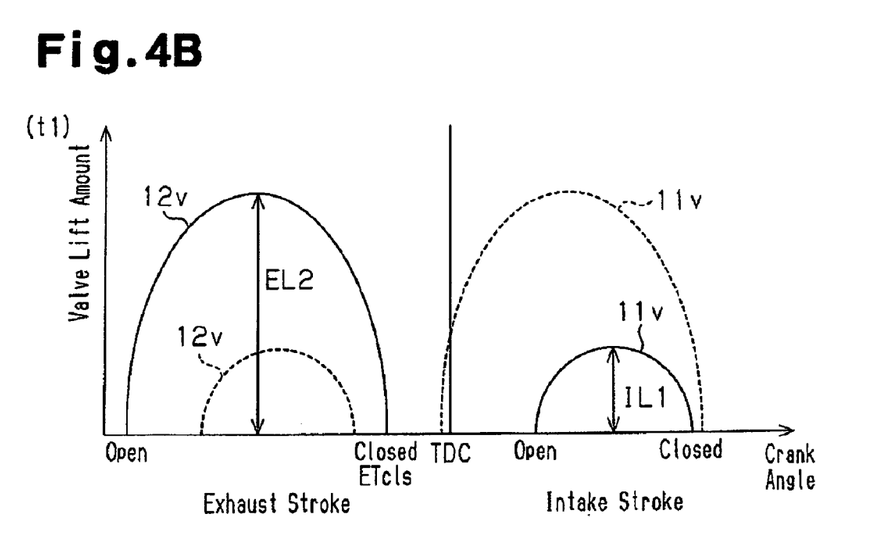
FIG. 4B is a timing chart showing the intake lift amount and the exhaust lift amount in a state where the exhaust lift amount is increased from the state shown in FIG. 4A at time point t1.
Figure 5A:
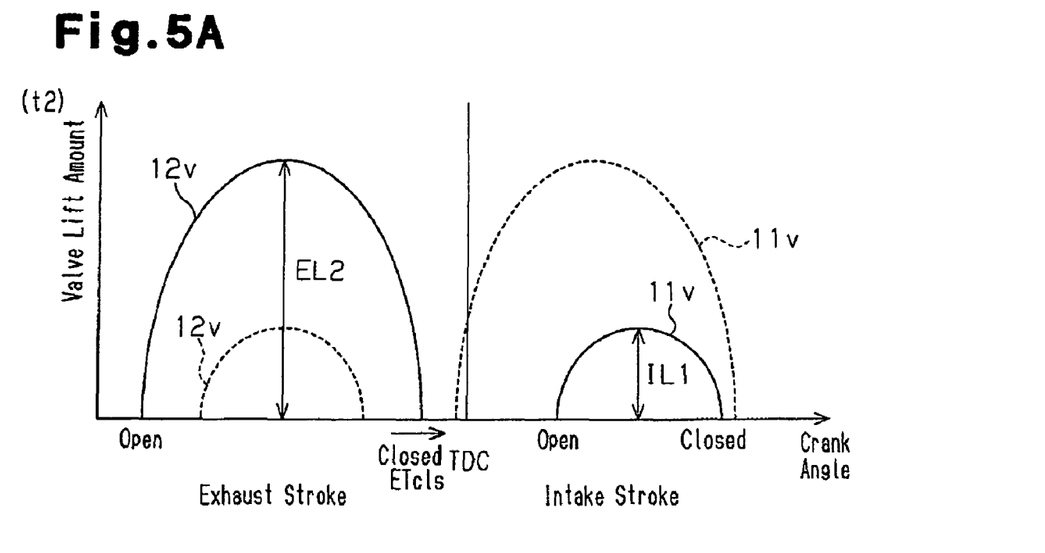
FIG. 5A is a timing chart showing the intake lift amount and the exhaust lift amount in a state where the exhaust valve timing is delayed from the state shown in FIG. 4B at time point t2.
Figure 5B:
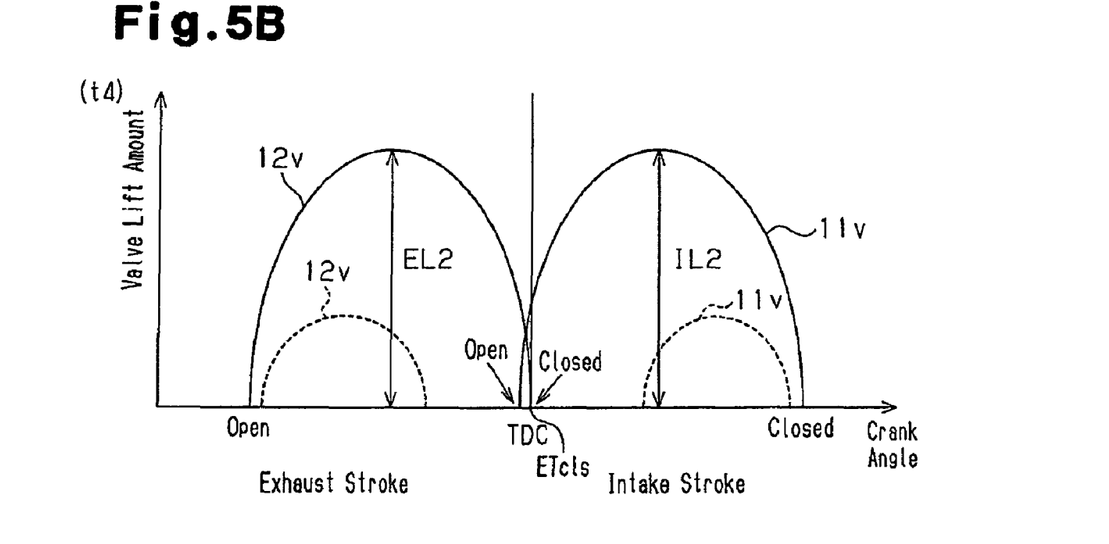
FIG. 5B is a timing chart showing the intake lift amount and the exhaust lift amount in a state where the intake lift amount is increased from the state shown in FIG. 5A in the spark ignition combustion at time point t4.

FIG. 2 shows the operating range of each of the HCCI combustion and the spark ignition combustion of the HCCI engine 1. The graph shown in FIG. 2 has a vertical axis representing the engine load and a horizontal axis representing the engine rotational speed. The spark ignition combustion range surrounds the HCCI combustion range. The arrows shown in FIG. 2 represent various switching patterns from the HCCI combustion to the spark ignition combustion. The switching patterns shown in FIGS. 3 to 5 are examples of the various combustion mode switching patterns shown in FIG. 2.

FIGS. 3 to 5B show the switching patterns from the HCCI combustion to the spark ignition combustion according to the present embodiment.

Figure 3:
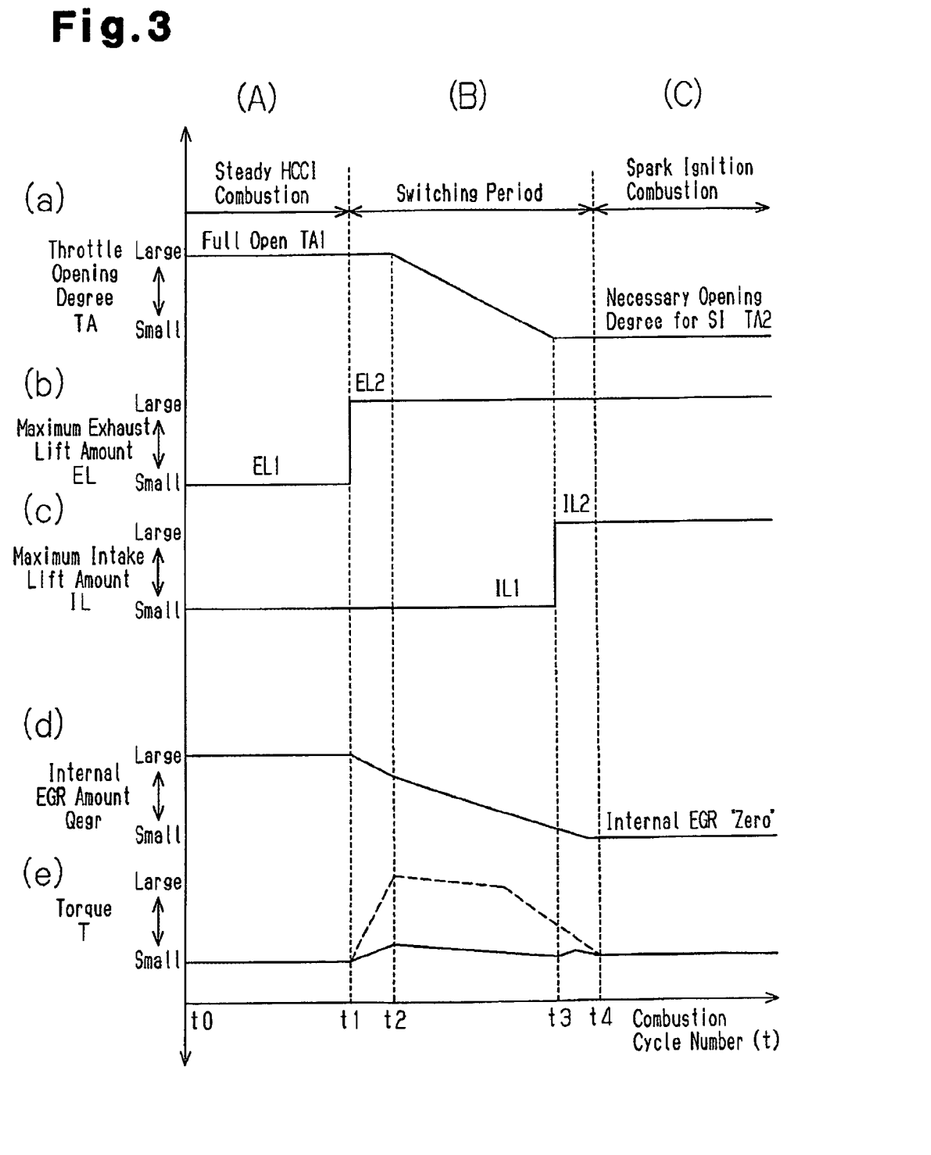
FIG. 3 is a timing chart showing (a) throttle opening degree, (b) maximum exhaust lift amount, (c) maximum intake lift amount, (d) internal EGR gas amount, and (e) torque fluctuation, when the combustion mode of the HCCI engine of FIG. 1 is switched from the HCCI combustion to the spark ignition combustion.

The vertical axis in FIG. 3 shows:
(a) throttle opening degree TA;
(b) maximum exhaust lift amount EL;
(c) maximum intake lift amount IL;
(d) internal EGR amount Qegr in the combustion chamber 10; and
(e) torque T of the HCCI engine.

The horizontal axis in FIG. 3 represents the number of combustion cycles. FIG. 3 shows:
(A) steady operation period of the HCCI combustion;
(B) switching period from the HCCI combustion to the spark ignition combustion; and
(C) steady operation period of the spark ignition combustion (SI combustion).

The ECU 5 controls the throttle opening degree TA, the maximum exhaust lift amount EL, and the maximum intake lift amount IL thereby controlling the internal EGR amount Qegr and the torque T.

FIGS. 4A, 4B, 5A, and 5B show the intake lift amount and the exhaust lift amount when the combustion mode is switched from the HCCI combustion to the spark ignition chamber. FIG. 4A shows a first intake lift amount and a first exhaust lift amount at the time of the steady operation of the HCCI combustion. That is, FIG. 4A shows an intake cam profile of the intake valve 11*v* and an exhaust cam profile of the exhaust valve 12*v* at time point t0 in FIG. 3. FIG. 5B shows a second intake lift amount and a second exhaust lift amount at the time of the steady operation of the spark ignition combustion. That is, FIG. 5B shows the intake cam profile of the intake valve 11*v* and the exhaust cam profile of the exhaust valve 12*v* at time point t4 in FIG. 3. The horizontal axis in FIGS. 4A to 5B shows the crank angle. The vertical axis in FIGS. 4A to 5B shows the intake lift amount and the exhaust lift amount.

As shown in FIG. 3(*a*), the throttle opening degree TA is set to be the first throttle opening degree TA1 at time point t0 at the time of the HCCI combustion, and is set to be the second throttle opening degree TA2 at time point t4 at the time of spark ignition combustion. The first throttle opening degree TA1 is greater than the second throttle opening degree TA2.

In the present embodiment, the first throttle opening degree TA1 is set to be a fully open state of the throttle 3. Pressure difference is caused in the intake passage 11*p* between the upstream portion and the downstream portion with respect to the throttle 3. The intake negative pressure is caused in the intake passage 11*p* at the downstream portion with respect to the throttle 3. Atmospheric pressure is in the upstream portion of the intake passage 11*p* with respect to the throttle 3. The first throttle opening degree TA1 is preferably set to be a fully open state of the throttle 3 so as to reduce pumping loss by setting the intake negative pressure closer to the atmospheric pressure. The second throttle opening degree TA2 is a throttle opening degree that is necessary for the spark ignition combustion depending on the operating range of the HCCI engine 1.

A solid line in FIG. 4A represents the first intake lift amount IL1 and the first exhaust lift amount EL1. A dotted line in FIG. 4A shows the second intake lift amount IL2 and the second exhaust lift amount EL2. That is, the dotted line represents a comparative example in FIGS. 4A to 5B.

The ECU 5 switches the maximum exhaust lift amount EL from the first exhaust lift amount EL1 to the second exhaust lift amount EL2 at time point t1. FIG. 4B shows a state immediately after the exhaust valve 12*v* is switched, or immediately after time point t1. In other words, FIG. 4B shows a state immediately after the maximum exhaust lift amount EL is switched from the first exhaust lift amount EL1 represented by the dotted line to the second exhaust lift amount EL2 represented by the solid line. The exhaust variable valve mechanism 12*a* switches the exhaust cam 12*c* from the low lift cam to the high lift cam so as to switch the exhaust valve 12*v*. Therefore, the maximum exhaust lift amount EL is increased, and the valve duration of the exhaust valve is increased. Increase of the valve duration of the exhaust valve changes the exhaust valve open/close timing. In other words, the exhaust closing timing ETcls, which is the same as the closing timing of the exhaust valve 12*v*, is slightly delayed.

The ECU 5 sets the exhaust closing timing ETcls at time point t1 such that the HCCI combustion is maintained without executing spark ignition, and the internal EGR amount is ensured. As shown in FIG. 4B, the exhaust closing timing ETcls is set before the exhaust top dead center TDC. When the exhaust closing timing ETcls is delayed, the exhaust closing timing ETcls approaches to the exhaust top dead center TDC.

The ECU 5 switches the maximum intake lift amount IL from the first intake lift amount IL1 to the second intake lift amount IL2 at time point t3. In other words, the ECU 5 switches the exhaust valve 12*v* at time point t1 so as to maintain the state in which the internal EGR gas exists before the intake valve 11v is switched at time point t3. That is, when switching the combustion mode from the HCCI combustion to the spark ignition combustion, the ECU 5 switches the exhaust valve 12v while ensuring the internal EGR gas before switching the intake valve 11v.

Since the exhaust closing timing ETcls is slightly delayed between time point t1 and time point t2, the internal EGR amount Qegr is reduced between time point t1 and time point t2 as shown in FIG. 3(d). At time point t2, the throttle opening degree TA is still equal to the first throttle opening degree TA1 that is fully open. Decrease of the internal EGR amount Qegr means increase of the intake air amount from the intake passage 11p to the combustion chamber 10. However, since the ECU 5 switches the maximum exhaust lift amount EL from the first exhaust lift amount EL1 to the second exhaust lift amount EL2 so as to ensure the internal EGR amount Qegr, the fluctuation of the intake air amount is moderate. Therefore, the torque T caused from the HCCI engine 1 increases by a small amount, however, the torque T is prevented from increasing greatly. This suppresses occurrence of the abrupt changes in the torque T of the HCCI engine 1.

A dotted line in FIG. 3(e) shows a torque curve of a comparative example. According to the comparative example, for example, the maximum exhaust lift amount EL is switched from the first exhaust lift amount EL1 to the second exhaust lift amount EL2 at the same time when the maximum intake lift amount IL is switched from the first intake lift amount IL1 to the second intake lift amount IL2. In the case of the comparative example, since there is no internal EGR gas, the intake air amount is abruptly changed and the torque T is greatly increased. In other words, according to the comparative example, the intake air amount to the combustion chamber 10 is abruptly changed before and after the combustion mode is switched from the HCCI combustion to the spark ignition combustion. According to the present embodiment, the fluctuation of the torque T is moderate compared to a case where firstly the throttle opening degree TA is made smaller when the combustion mode is switched from the HCCI combustion to the spark ignition combustion.

After time point t2, the ECU 5 delays the exhaust closing timing ETcls so as to reduce the internal EGR amount Qegr, as shown in FIG. 3(d). Accordingly, the ECU 5 controls the exhaust closing timing ETcls to control the intake air amount to the combustion chamber 10. In the present embodiment, the intake air to the combustion chamber 10 means air-fuel mixture generated at the mixing portion 4. FIG. 5A shows a state between time points t2 and t3. The exhaust closing timing ETcls in FIG. 5A is delayed from the exhaust closing timing ETcls in FIG. 4B. Therefore, the ECU 5 delays the exhaust closing timing ETcls to gradually reduce the internal EGR amount Qegr. As a result, the intake air amount to the combustion chamber 10 is suppressed from changing suddenly. This suppresses the occurrence of the abrupt changes in the torque T as shown by the solid line in FIG. 3(e).

During a period between the time point t2 and the time point t3, the ECU 5 delays the exhaust closing timing ETcls to reduce the internal EGR amount Qegr as shown in FIG. 3(d) and reduces the throttle opening degree TA as shown in FIG. 3(a). The decrease of the internal EGR amount Qegr shown in FIG. 3(d) means increase of the intake air amount to the combustion chamber 10. On the other hand, the decrease of the throttle opening degree TA shown in FIG. 3(a) means the decrease of the intake air amount to the combustion chamber 10. Therefore, during the period between the time point t2 and the time point t3, the simultaneous operation of reducing the throttle opening degree TA and reducing the internal EGR amount Qegr further suppresses the sudden fluctuation of the intake air amount to the combustion chamber 10. In other words, the combustion mode is switched from the HCCI combustion to the spark ignition combustion while the occurrence of the abrupt changes in the torque T is further suppressed.

At the time point t3, the throttle opening degree TA is reduced to the second throttle opening degree TA2. The internal EGR amount Qegr that is required for preventing the HCCI combustion from being difficult depending on the operating range of HCCI engine 1 is referred to as a critical EGR amount Qegr0. The state where the HCCI combustion is difficult refers to a state where the internal EGR amount Qegr is reduced so that the temperature in the cylinders of the HCCI engine 1 does not sufficiently increases, and the ignitability of the air-fuel mixture in the HCCI combustion is remarkably deteriorated. In the present embodiment, the internal EGR amount Qegr at time point t3 is greater than the critical EGR amount Qegr0. Therefore, the ECU 5 switches the maximum intake lift amount IL from the first intake lift amount IL1 to the second intake lift amount IL2 at time point t3.

If the internal EGR amount Qegr obtained when the throttle opening degree TA is reduced to the second throttle opening degree TA2 will be smaller than the critical EGR amount Qegr0, the ECU 5 switches the maximum intake lift amount IL from the first intake lift amount IL1 to the second intake lift amount IL2 when the internal EGR amount Qegr is greater than the critical EGR amount Qegr0. In other words, the ECU 5 may switch the maximum intake lift amount IL from the first intake lift amount IL1 to the second intake lift amount IL2 before time point t3. If the HCCI combustion will be difficult to be carried out before the throttle opening degree TA is reduced to the second throttle opening degree TA2, the ECU 5 switches the maximum intake lift amount IL from the first intake lift amount IL1 to the second intake lift amount IL2 before a time point at which the HCCI combustion will be difficult to be carried out.

At time point t3, the ECU 5 switches the maximum intake lift amount IL from the first intake lift amount IL1 to the second intake lift amount IL2. In other words, the intake variable valve mechanism 11a switches the intake cam 11c from the low lift cam to the high lift cam. Therefore, the maximum intake lift amount IL is switched from the first intake lift amount IL1 shown in FIG. 5A to the second intake lift amount IL2 shown in FIG. 5B. That is, the maximum intake lift amount IL and the valve duration of the intake valve increase. As shown in FIG. 5B, the opening timing of the intake valve 11v is advanced from the TDC, because the air intake operation to the combustion chamber 10 is started slightly after the intake valve 11v is opened.

When the internal EGR amount Qegr is zero at time point t4, the ECU 5 starts the steady operation of spark ignition by the ignition plug 60c. The intake air amount to the combustion chamber 10 will be increased due to the switching from the first intake lift amount IL1 to the second intake lift amount IL2. However, since the throttle opening degree TA has been reduced to the second throttle opening degree, the fluctuation of the intake air amount is not great. Therefore, the fluctuation of the torque T is suppressed to be small. Accordingly, the ECU 5 switches the combustion mode from the HCCI combustion to the spark ignition combustion.

The present embodiment has following advantages.

(1) When switching the combustion mode from the HCCI combustion to the spark ignition combustion, the ECU 5 carries out the following operations a) and b) before switching the maximum intake lift amount IL from the first intake lift amount IL1 to the second intake lift amount IL2:

a): switching the maximum exhaust lift amount EL from the first exhaust lift amount EL1 to the second exhaust lift amount EL2 while ensuring the internal EGR amount Qegr; and b): delaying the exhaust closing timing ETcls so as to reduce the internal EGR amount Qegr after switching the maximum exhaust lift amount EL from the first exhaust lift amount EL1 to the second exhaust lift amount EL2.

Therefore, the internal EGR amount Qegr is ensured immediately after the maximum exhaust lift amount EL is switched from the first exhaust lift amount EL1 to the second exhaust lift amount EL2. This suppresses abrupt change of the intake air amount from the intake passage 11p to the combustion chamber 10 during a period between before and after the maximum exhaust lift amount EL is switched from the first exhaust lift amount EL1 to the second exhaust lift amount EL2. Further, the ECU 5 delays the exhaust closing timing ETcls to reduce the internal EGR amount Qegr after switching the maximum exhaust lift amount EL. Accordingly, the combustion mode is switched to the spark ignition combustion as the intake air amount is gradually changed. In other words, the change following capability of the intake air amount is prevented from deteriorating when the exhaust closing timing ETcls is delayed. This suppresses abrupt change of the intake air amount when the combustion mode is switched from the HCCI combustion to the spark ignition combustion. Accordingly, the occurrence of the abrupt changes in the torque T is suppressed. Further, early ignition or excessive combustion noise of the HCCI engine 1 are prevented.

(2) After switching to the second exhaust lift amount EL2, the ECU 5:

b): delays the exhaust closing timing ETcls and reduces the throttle opening degree TA simultaneously. In other words, during a period from time point t2 to time point t3, the intake air amount is reduced due to the decrease of the throttle opening degree TA and the intake air amount is increased due to the decrease of the internal EGR amount Qegr simultaneously. Accordingly, the combustion mode is switched from the HCCI combustion to the spark ignition combustion while the intake air amount being gradually changed during a period from time point t2 to time point t3.

(3) The intake variable valve mechanism 11a switches the intake cam 11c from the low lift cam to the high lift cam. The exhaust variable valve mechanism 12a switches the exhaust cam 12c from the low lift cam to the high lift cam. Therefore, unlike the complicated variable valve mechanism of an electromagnetic driving type, each of the intake variable valve mechanism 11a and the exhaust variable valve mechanism 12a has a simple structure.

(4) After the internal EGR gas starts to be reduced, the ECU 5 switches the intake valve 11v at a timing that is earlier one of the timing when the throttle opening degree TA is decreased to the opening degree that is required for the spark ignition combustion and the timing before the time point when the HCCI combustion becomes difficult to be carried out. As a result, the ECU 5 reliably switches the combustion mode from the HCCI combustion to the spark ignition combustion. According to the present embodiment, the combustion mode is reliably switched from the HCCI combustion to the spark ignition combustion even if the HCCI engine 1 is not provided with an in-cylinder injector.

The present embodiment may be modified as follows.

The intake valve characteristics such as the valve lift amount and the valve open/close timing of the intake valve 11v may be switched by an electromagnetic driving mechanism. Similarly, the exhaust valve characteristics EL such as the valve lift amount and the valve open/close timing of the exhaust valve 12v may be switched by an electromagnetic driving mechanism.

The first throttle opening degree TA1 may be smaller than the fully open state of the throttle 3.

The intake variable valve mechanism 11a may have a mechanism for changing the maximum intake lift amount IL and a mechanism for changing the valve open/close timing separately. Similarly, the exhaust variable valve mechanism 12a may have a mechanism for changing the maximum exhaust lift amount EL and a mechanism for changing the valve open/close timing separately.

When the maximum exhaust lift amount EL is switched from the first exhaust lift amount EL1 to the second exhaust lift amount EL2, the internal EGR gas might be reduced and the ignitability of the HCCI engine 1 might be deteriorated. In such a case, the ignition plug 60c may ignite the engine accessorily. The ECU 5 is capable of controlling the spark ignition irrespective of the operation of the intake variable valve mechanism 11a and the exhaust variable valve mechanism 12a.

After time point t2, the ECU 5 may ignite the engine with the ignition plug 60c in an auxiliary way to stabilize the combustion of the HCCI engine 1 while reducing the internal EGR amount Qegr.

What is claimed is:

1. A homogeneous charge compression ignition (HCCI) engine, wherein the HCCI engine allows a combustion mode to be switched between an HCCI combustion and a spark ignition combustion, the HCCI engine comprising:

a combustion chamber;

an intake valve;

an exhaust valve;

an intake variable valve mechanism for changing an intake lift amount, which is a lift amount of the intake valve, wherein the intake lift amount is set to a first intake lift amount in the HCCI combustion, and the intake lift amount is set to a second intake lift amount in the spark ignition combustion;

an exhaust variable valve mechanism for changing an exhaust lift amount, which is a lift amount of the exhaust valve, wherein the exhaust lift amount is set to a first exhaust lift amount in the HCCI combustion, and the exhaust lift amount is set to a second exhaust lift amount in the spark ignition combustion; and a controller for controlling the intake variable valve mechanism and the exhaust variable valve mechanism, wherein the controller sets an internal EGR amount, which includes the amount of burned gas that remains in the combustion chamber at the time of the HCCI combustion, by setting a negative valve overlap period, during which both of the intake valve and the exhaust valve are closed, such that not all the burned gas is discharged from the combustion chamber, and wherein, when switching the combustion mode from the HCCI combustion to the spark ignition combustion, the controller executes following operations a) and b) before switching the intake lift amount from the first intake lift amount to the second intake lift amount, a): switching the exhaust lift amount from the first exhaust lift amount to the second exhaust lift amount while ensuring the internal EGR amount, and b): delaying a closing timing of the exhaust valve so as to reduce the internal EGR amount after switching the exhaust lift amount from the first exhaust lift amount to the second exhaust lift amount.

2. The HCCI engine according to claim 1, further comprising a throttle,
wherein the opening degree of the throttle is controlled so as to control the intake air amount to the combustion chamber, and
wherein after switching to the second exhaust lift amount, the controller reduces the throttle opening degree, while delaying a closing timing of the exhaust valve.

3. The HCCI engine according to claim 2, wherein the exhaust variable valve mechanism has a low lift cam and a high lift cam for driving the exhaust valve, and the exhaust variable valve mechanism switches the exhaust valve between the low lift cam and the high lift cam to control the exhaust lift amount.

4. The HCCI engine according to claim 2, wherein the throttle opening degree is set to a first throttle opening degree in the HCCI combustion and the throttle opening degree is set to a second throttle opening degree at the time of the spark ignition combustion, and the second throttle opening degree is smaller than the first throttle opening degree,
wherein the controller starts to switch the intake lift amount from the first intake lift amount to the second intake lift amount at a timing that is earlier one of
c): time point when the throttle opening degree is reduced to the second throttle opening degree and
d): immediately before a time point when the HCCI combustion is difficult to be carried out due to decrease of the internal EGR amount.

5. A method for controlling a homogeneous charge compression ignition (HCCI) engine, wherein the HCCI engine allows a combustion mode to be switched between HCCI combustion and spark ignition combustion, the HCCI engine including:
a combustion chamber;
an intake valve;
an exhaust valve;
an intake variable valve mechanism for changing an intake lift amount, which is a lift amount of the intake valve wherein the intake lift amount is set to a first intake lift amount in the HCCI combustion, and the intake lift amount is set to a second intake lift amount in the spark ignition combustion; and
an exhaust variable valve mechanism for changing an exhaust lift amount, which is a lift amount of the exhaust valve wherein the exhaust lift amount is set to a first exhaust lift amount in the HCCI combustion and the exhaust lift amount is set to a second exhaust lift amount in the spark ignition combustion;
wherein the controlling method comprising:
setting an internal EGR amount, which includes the amount of burned gas that remains in the combustion chamber at the time of the HCCI combustion by setting a negative valve overlap period, during which both of the intake valve and the exhaust valve are closed, such that not all the burned gas is discharged from the combustion chamber; and
executing following operations of a) and b) before switching the intake lift amount from the first intake lift amount to the second intake lift amount, when switching the combustion mode from the HCCI combustion to the spark ignition combustion,
a): switching the exhaust lift amount from the first exhaust lift amount to the second exhaust lift amount while ensuring the internal EGR amount, and
b): delaying a closing timing of the exhaust valve so as to reduce the internal EGR amount after switching the exhaust lift amount from the first exhaust lift amount to the second exhaust lift amount.

* * * * *